United States Patent [19]

Ozawa et al.

[11] Patent Number: 4,769,307

[45] Date of Patent: Sep. 6, 1988

[54] OPTICAL RECORDING MEMBER

[75] Inventors: Tetsuo Ozawa, Hatano; Shuichi Maeda, Saitama; Yutaka Kurose, Kawasaki, all of Japan

[73] Assignee: Mitsubishi Chemical Industries Limited, Tokyo, Japan

[21] Appl. No.: 30,868

[22] PCT Filed: Aug. 12, 1986

[86] PCT No.: PCT/JP86/00412

§ 371 Date: Feb. 25, 1987

§ 102(e) Date: Feb. 25, 1987

[87] PCT Pub. No.: WO87/01076

PCT Pub. Date: Feb. 26, 1987

[30] Foreign Application Priority Data

Aug. 13, 1985 [JP] Japan .................. 60-178221

[51] Int. Cl.$^4$ .................. G11B 7/24; G03C 1/72; G03C 5/16
[52] U.S. Cl. .................. 430/270; 430/495; 430/945; 540/139
[58] Field of Search .................. 430/945, 270, 495; 540/122, 129, 130, 131, 139; 346/135.1

[56] References Cited

U.S. PATENT DOCUMENTS

| | | | |
|---|---|---|---|
| 2,122,137 | 6/1938 | Gassner et al. | 540/122 |
| 2,795,583 | 6/1957 | Martin et al. | 540/129 |
| 2,859,219 | 11/1958 | Randall et al. | 540/131 |
| 4,492,750 | 1/1985 | Law et al. | 430/945 |

FOREIGN PATENT DOCUMENTS

| | | |
|---|---|---|
| 50-85630 | 7/1975 | Japan . |
| 56-86795 | 7/1981 | Japan . |
| 57-82093 | 5/1982 | Japan . |
| 60-184565 | 9/1985 | Japan . |
| 61-177287 | 8/1986 | Japan . |
| 1489394 | 10/1977 | United Kingdom . |

Primary Examiner—Paul R. Michl
Assistant Examiner—Mark R. Buscher
Attorney, Agent, or Firm—Oblon, Fisher, Spivak, McClelland & Maier

[57] ABSTRACT

An optical recording member for performing recording and reproduction of information by causing changes in the state thereof with a laser beam, which optical recording member comprises a base plate and a recording layer provided on the base plate and containing therein a phthalocyanine type compound and/or naphthalocyanine type compound represented by the following general formula:

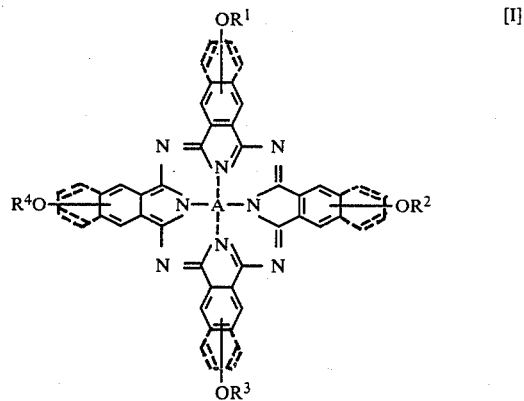

(where: $R^1$ to $R^4$ represent substituted and/or unsubstituted alkyl group, alkoxyalkyl group, aryl group, and so forth; and A denotes Pb, Sn, Cu, Ni, VO, and so on).

7 Claims, No Drawings

OPTICAL RECORDING MEMBER

TECHNICAL FIELD

This invention relates to an optical recording member containing phthalocyanine type coloring matter in its information recording layer.

More specifically, the invention is concerned with such optical recording member that performs recording of information utilizing changes in the state of substance due to light energy having an oscillating wavelength of a semiconductor laser.

BACKGROUND ART

Development in the optical recording which utilizes laser technology has been desired particularly in recent years owing to its capability of preservation and reproduction of information recorded in high density.

As one example of such optical recording, there may be mentioned an optical disc.

In general, the optical disc carries out high density recording of information by irradiation of laser beam which has been collimated to a beam diameter of 1 μm or so onto a thin recording layer provided on a circular base member The information recording is effected by thermal deformation of the recording layer such as its decomposition, evaporation, dissolution, and others which take place at particular portions of the recording layer owing to its absorption of the laser energy as irradiated onto it. On the other hand, the reproduction of the recorded information is done by reading of a difference in the reflection factor between the portion where the deformation has taken place by the laser beam and the portion where no deformation has occurred.

For the recording member, therefore, it is necessary to have high absorptivity to the laser beam of a particular wavelength to be used for the recording, because the recording member is required to absorb energy of the laser beam with good efficiency, and also to have high reflection factor to the laser beam of a particular wavelength for use in the reproduction so as to carry out the accurate reproduction of the recorded information.

For such optical recording member, there have so far been proposed various inorganic compounds such as metals, metal compounds, chalcogenides, and so on. However, the thin films made of these inorganic compounds have various disadvantages such that they are susceptible to oxidation in the air, difficult to preserve over a long period of time, sensitive to the ultraviolet part or the visible part of the light rays, not durable against sun light and other light, and so forth.

As the organic compounds to be used for the recording member, there have so far been proposed cyanine type coloring matter, squalerium type coloring matter, naphthoquinone type coloring matter, phthalocyanine type coloring matter, and so on. Of these various coloring matters, the phthalocyanine type coloring matter is highly stable to the ultraviolet part and the visible part of the light rays, while it is remarkably inferior in its solubility to organic solvents, hence it has a shortcoming such that the economically advantageous coating method cannot be adopted for the thin film forming.

DISCLOSURE OF INVENTION

It is an object of the present invention to provide an optical recording member of an organic substance which has high sensitivity to writing by the laser beam, particularly the semiconductor laser beam, has good stability in its preservation, and yet, is capable of forming the thin film by the coating method.

The present invention has its gist in an optical recording member comprising a substrate; and a recording layer which contains therein a light absorbing substance to be represented by the following general formula [I]:

General Formula [I]

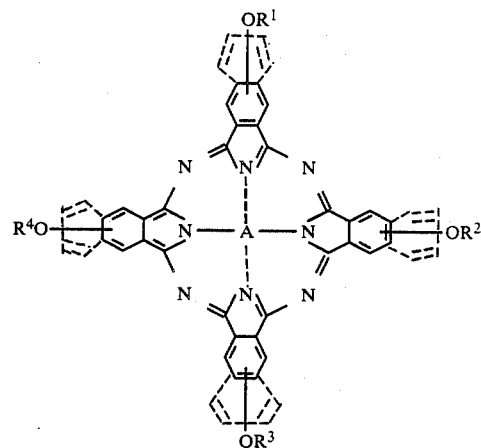

(where: $R^1$, $R^2$, $R^3$ and $R^4$ represent the alkyl group having $C_1$ to $C_{22}$ which may be substituted, or $-(C_2H_4O)_nY$, or

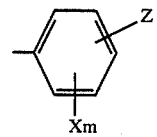

(x denoting halogen atom; Y representing hydrogen atom, aryl group, or alkyl group which may be substituted; n indicating an integer of from 1 to 4; m indicating an integer of 0, 1 or 2; and Z denoting hydrogen atom, carboxylic acid group, carboxylic acid ester group, aryl group, alkyl group which may be substituted, or alkoxy group which may be substituted); and A represents metals belonging to I-B group, II-A group, II-B group, III-A group, III-B group, IV-A group, IV-B group, V-B group and VIII group of the Periodic Table, or compounds containing therein such metals).

BEST MODE FOR CARRYING OUT THE INVENTION

The compound to be used as the light absorbing substance for the optical recording member according to the present invention is represented by the above general formula [I]. For the halogen atom represented by X in this light absorbing substance of the above-mentioned general formula [I], there may be exemplified fluorine, chlorine, bromine, iodine, and so forth; for Y, there may be enumerated hydrogen, aryl group such as phenyl group, etc., or alkyl group having $C_1$ to $C_{25}$ which may be substituted by hydroxyl group, carboxylic acid group or carboxylic acid ester group, among them, lower alkyl group having $C_1$ to $C_4$ such as methyl, ethyl, butyl, etc. is preferable; for Z, there may be enumerated hydrogen; carboxylic acid; carboxylic acid ester group; aryl group such as phenyl group, etc.; alkyl group having $C_1$ to $C_{25}$ which may be substituted by hydroxyl group, phenyl group, carboxylic acid group or carboxylic acid ester group; and alkoxy group which may be substituted by alkoxy group, alkoxy-alkoxy group, or alkoxy-alkoxy-alkoxy group, and so forth. For the substituent group of the alkyl group having $C_1$ to $C_{22}$ and which may be substituted by those groups as represented by $R^1$, $R^2$, $R^3$ and $R^4$, there may be exemplified hydroxyl group, carboxylic acid group or carboxylic acid ester group, and so on.

As the example of the metals for A belonging to I-B group, II-A group, III-A group, III-B group, IV-A group, IV-B group, V-B group and VIII group of the Periodic Table, there are Cu, Mg, Zn, Ge, Sn, Si, Pb, Fe, Co and Ni. As the example of the compounds containing such metals, there are AlCl, InCl, TiO, VO, $CeCl_2$, $SnCl_2$, $SnBr_2$, $SnF_2$, $SnI_2$ and so on. In the compound to be represented by the general formula [1], $R^1$, $R^2$, $R^3$ and $R^4$ should preferably be lower alkoxy lower alkyl group. Concrete examples of these are methoxy ethyl group and butoxy ethyl group. Also, the examples of A should preferably be VO, Ni and Cu. Among them VO is particularly favorable.

These compounds can be easily produced by a known method from o-dicyano compound to be represented by the following general formula [II] and a metal or a metal compound. (vide: for example, "Journal of American Chemical Society, Vol. 106, No. 174706-4711 (1984)"—article by A. W. Snow and N. L. Jarvis)

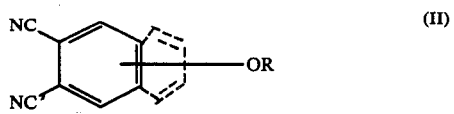
(II)

Where R has the same definition for $R^1$, $R^2$, $R^3$ or $R^4$ mentioned above. As the material for the base plate according to the present invention, there may be exemplified glass, plastics, and so forth. Of these various substrate materials, plastics is preferable from the standpoint of its stability and light weight. Examples of the plastics are: acrylic resin, methacrylic resin, polycarbonate resin, vinyl chloride resin, vinyl acetate resin, polyester resin, polyethylene resin, polypropylene resin, polyamide resin, polystyrene resin, epoxy resin, and so forth.

As the film forming method for the recording layer, there may be enumerated various known methods such as vacuum deposition of the thin film on the base plate; mixing of the thin film material with a resin solution and applying the mixed solution on the base plate; dissolution of the thin film material in a solvent and coating the solution on the base plate; or immersing the base plate into the coating liquid; and others. In particular, the compound of the present invention is suited for the coating method, since it has good solubility to the solvent.

The film forming by the application of the coating liquid may be attained by dissolving the compound as represented by the foregoing general formula [1] as the light absorbing substance into a solvent, for instance, with addition of a binder, as the case may be, and spin-coating the coating liquid onto the base plate. As the binder, there may be exemplified polyimide resin, polyamide resin, polystyrene resin, acrylic resin, polyester resin, polycarbonate resin, cellulosic resin, and so forth.

In this case, use of a mixture of phthalocyanine type compound and naphthalocyanine type compound out of the coating compound represented by the foregoing general formula [I] is preferable. A ratio of such light absorbing substance to the resin should desirably be 10% by weight or above.

As the solvent, there may be used dimethyl formamide, methyl ethyl ketone, methylcellosolve, ethanol, tetrahydrofuran, dichloromethane, chlorobenzene, and various others.

The recording layer for the optical recording member according to the present invention may be provided on both surfaces of the base plate or on one surface thereof.

Recording of information onto the recording member which has been obtained in the above-described manner is effected by irradiating a laser beam, preferably a semiconductor laser beam collimated to a beam diameter of 1 μm or so onto the recording layer provided on both surfaces or one surface of the substrate. Those portions of the recording layer irradiated by the laser beam bring about thermal deformation such as decomposition, evaporation, fusion, etc. owing to its absorption of the laser energy.

Reproduction of the recorded information is done by reading of a difference in the reflection factor between the portion where the thermal deformation has occurred by the laser beam and the portion where such thermal deformation has not taken place.

As the light source, various lasers such as He-Ne laser, Ar laser, semiconductor laser, etc. may be used. Among them, the semiconductor laser is particularly preferable in respect of the price and the size of the laser device.

The semiconductor laser to be used may have its central wavelength of 830 nm, 780 nm, and a wavelenght shorter than these.

EXAMPLE

Example 1

0.4 g of o-dicyano compound to be represented by the following structural formula:

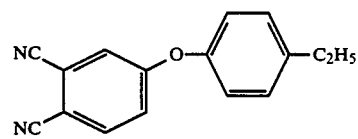

and 0.25 g of PbO were mixed and melted at an elevated temperature of 210° C. under a reduced pressure, and then the molten mixture was agitated at this temperature level for 14 hours. The thus obtained crude crystals were refined by a column chromatography to obtain 0.18 g of dark blue crystals of the light absorbing substance according to the present invention (m.p.243° C. to 244° C.) as represented by the following general formula [III]. The maximum absorbing wavelength $\lambda_{max}$ of this substance in the chloroform solvent was 723 nm.

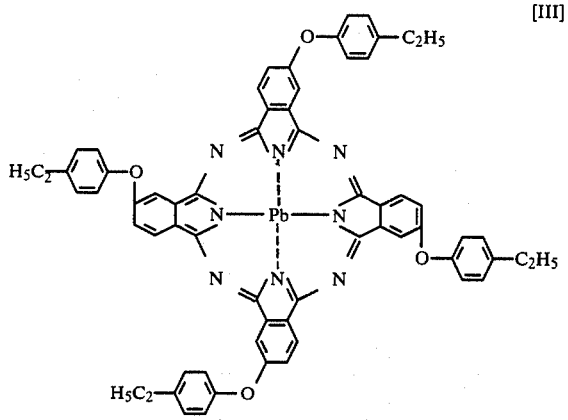

[III]

The light absorbing substance of the present invention as represented by the above formula [III] was dissolved into methyl ethyl ketone, and the solution was coated onto the base plate of methacrylic resin by the spin-coating technique (at the number of revolution of 2,000 rpm) to obtain a thin film of 2,500 Å thick. The maximum absorbing wavelength of this thin film was 730 nm, indicating that it had a broad peak.

To this thin film, the semiconductor laser beam having its central wavelength of 780 nm was irradiated with a beam diameter of about 1 μm and an output of 4 mW, whereupon pits of very clear and distinct profile, each having a width of about 1 μm and a pit length of about 2 μm were formed. The C/N (carrier level/noise level) ratio thereof was 52 dB. Table 1 below indicates the writing performance (C/N ratio) of this thin film by the semiconductor laser, after the same was preserved for ten days in a constant temperature and humidity vessel at 60° C. and 80% (of relative humidity).

Examples 2 to 36

The light absorbing substances of the present invention represented by the following formula [IV] to [XXXVI], and synthesized in accordance with Example 1 above were each formed into their respective films on an individual base plate of methacrylic resin under the substantially same conditions as in Example 1 above.

Table 1 shows, along with the results of Example 1 above, the maximum absorbing wavelength, the C/N ratio at the time of recording by the semiconductor laser, and the storage stability of the thin films of the light absorbing substances according to the present invention. In the Table, the storage stability thereof is shown in terms of the writing performance (C/N ratio) by the semiconductor laser, after the thin films were preserved for ten days in a constant temperature and humidity vessel at 60° C. and 80% (of relative humidity).

[V]
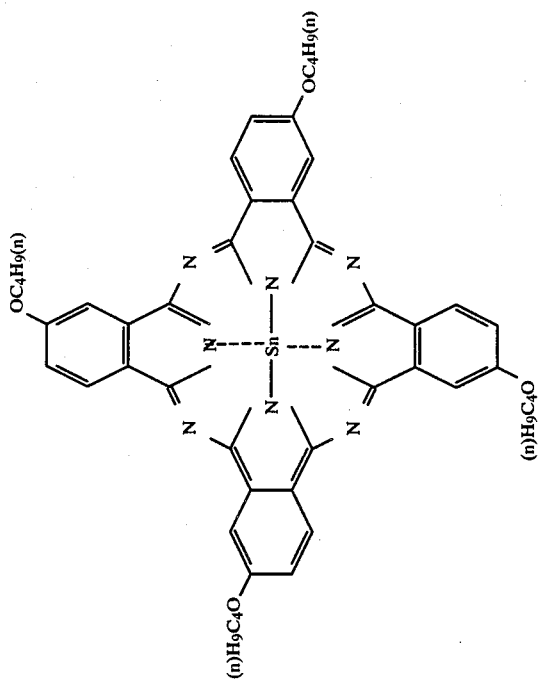
[VII]
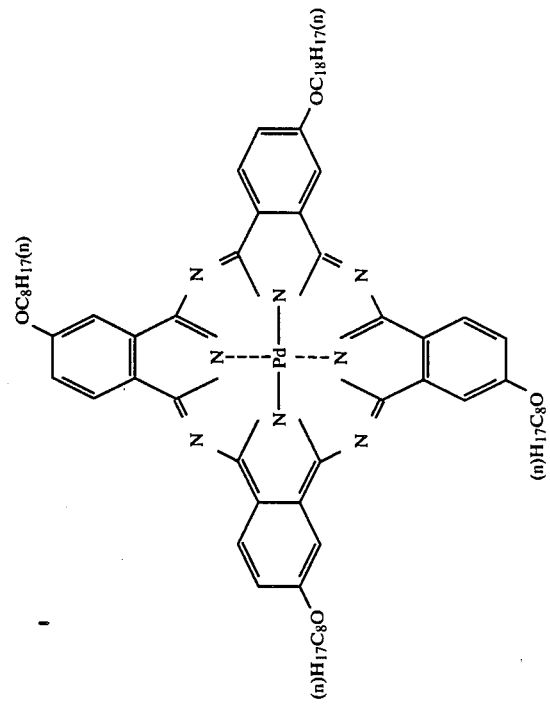
[IV]
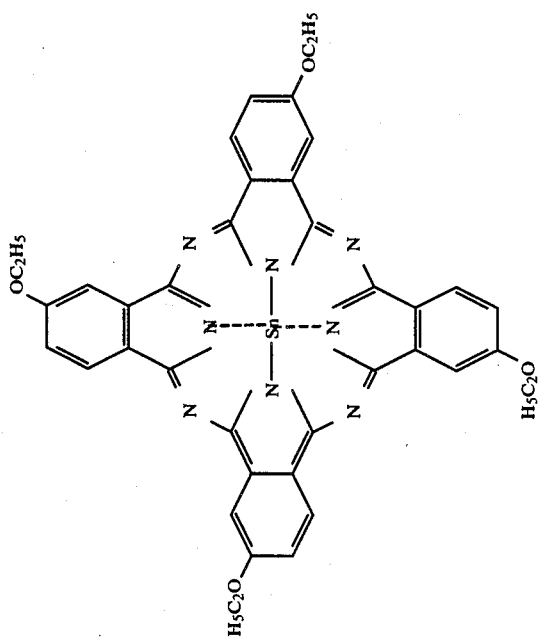
[VI]
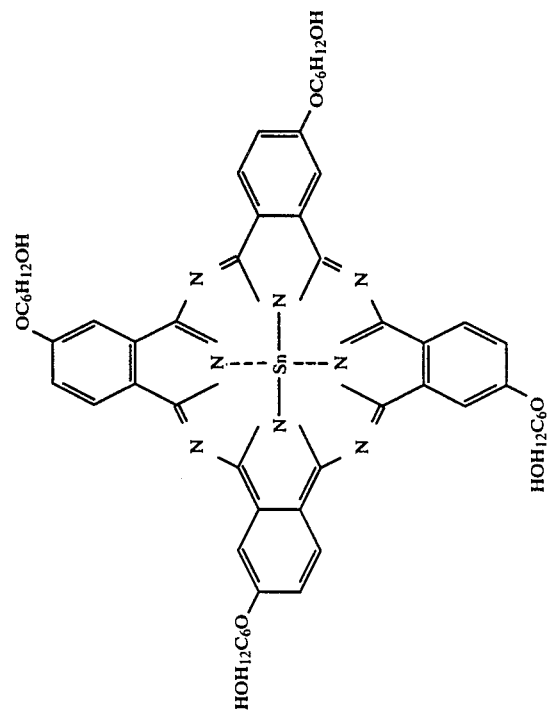

-continued
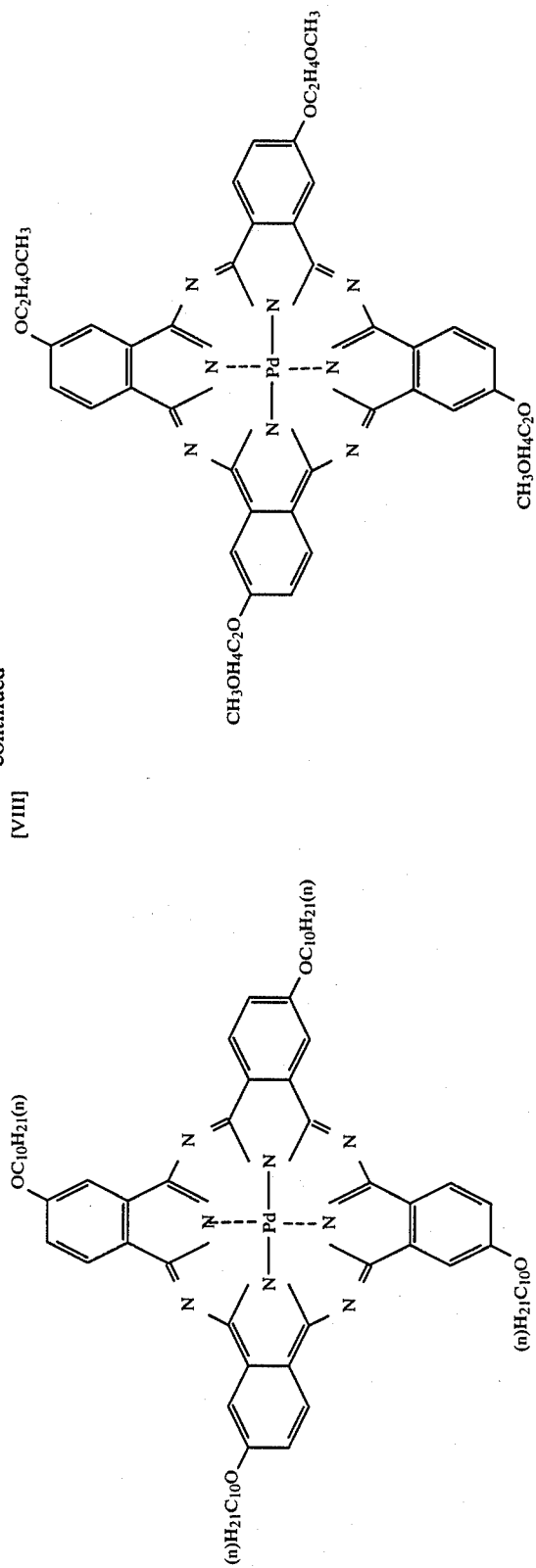
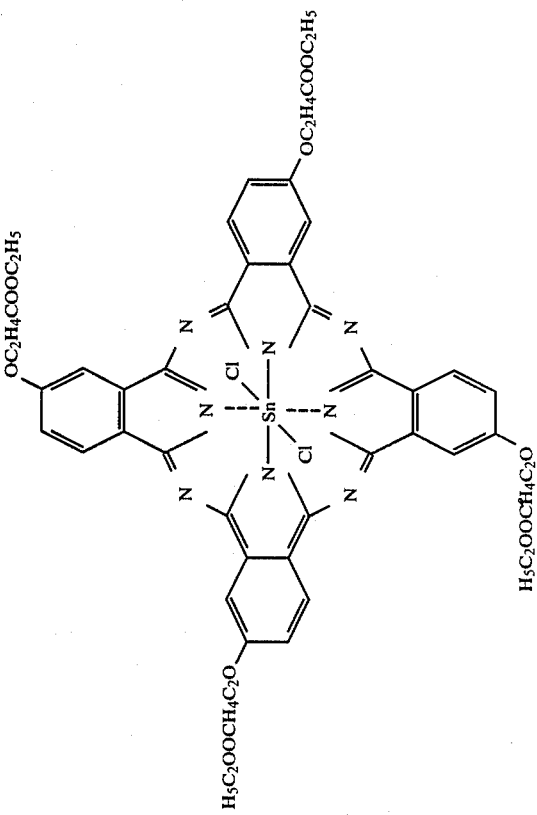

-continued
[XI]
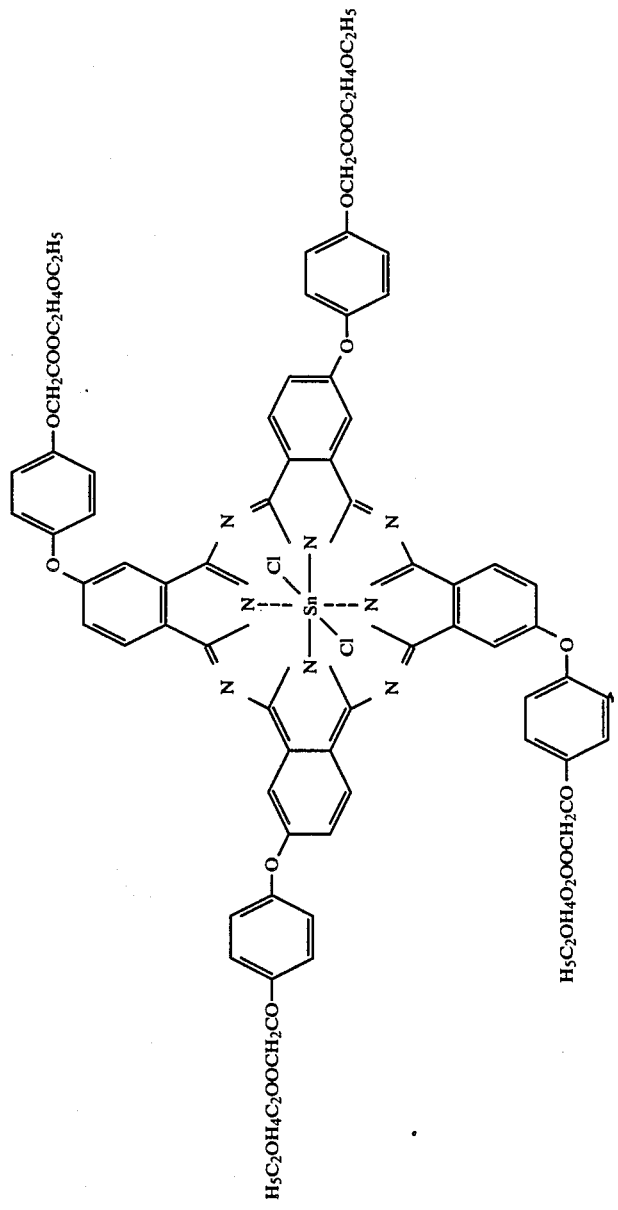

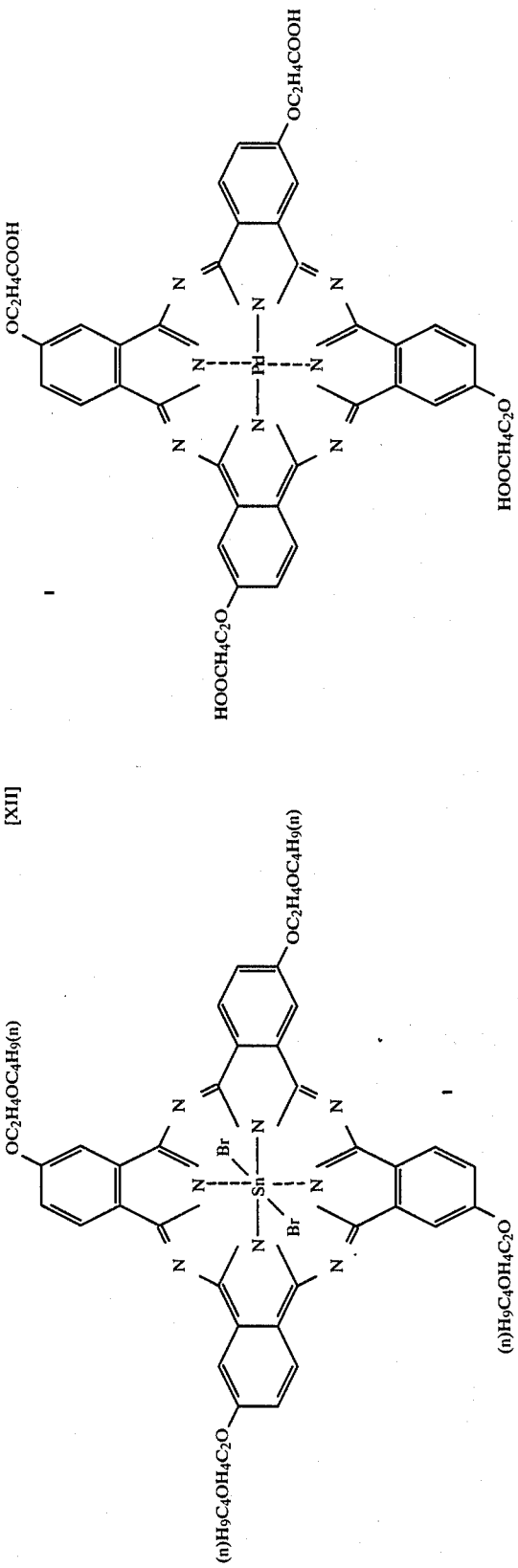
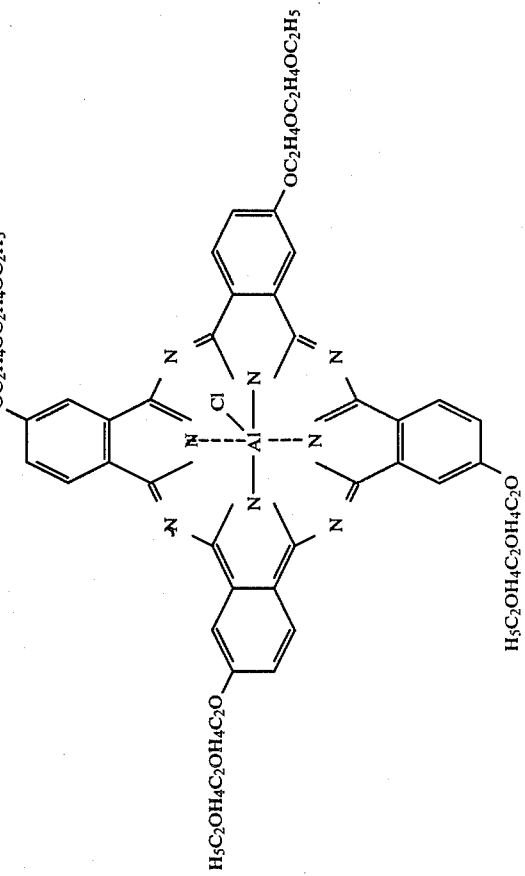

-continued
[XV]
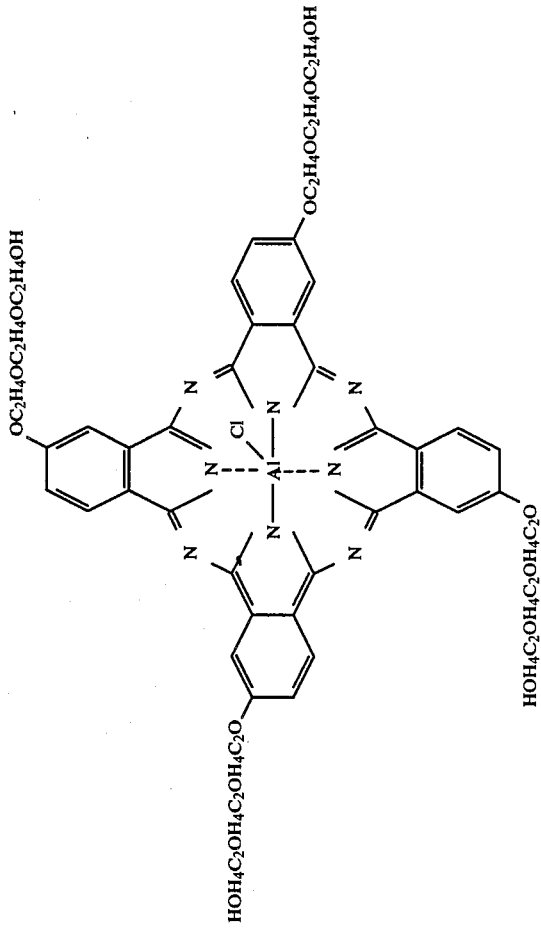

-continued
[XVII]
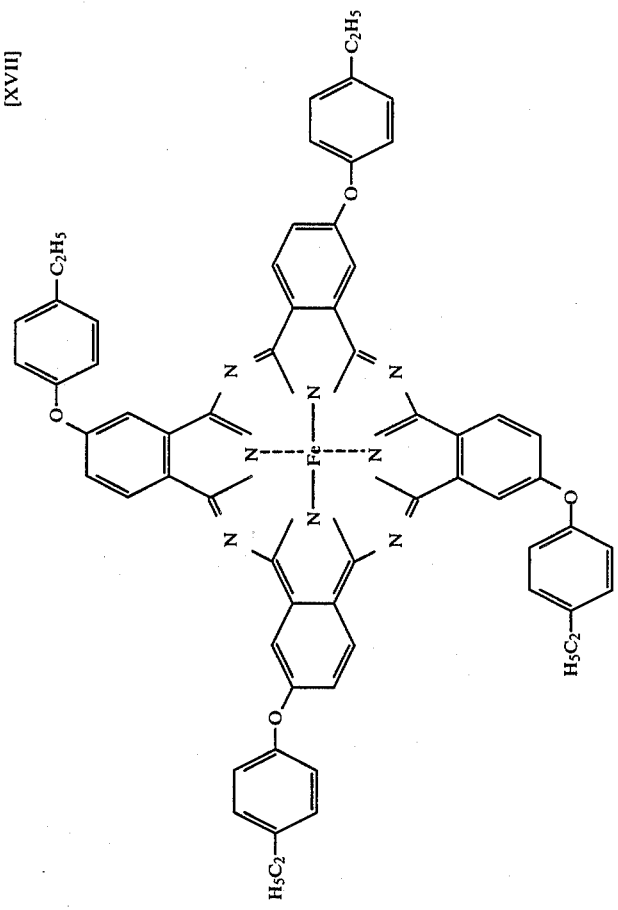
[XVI]
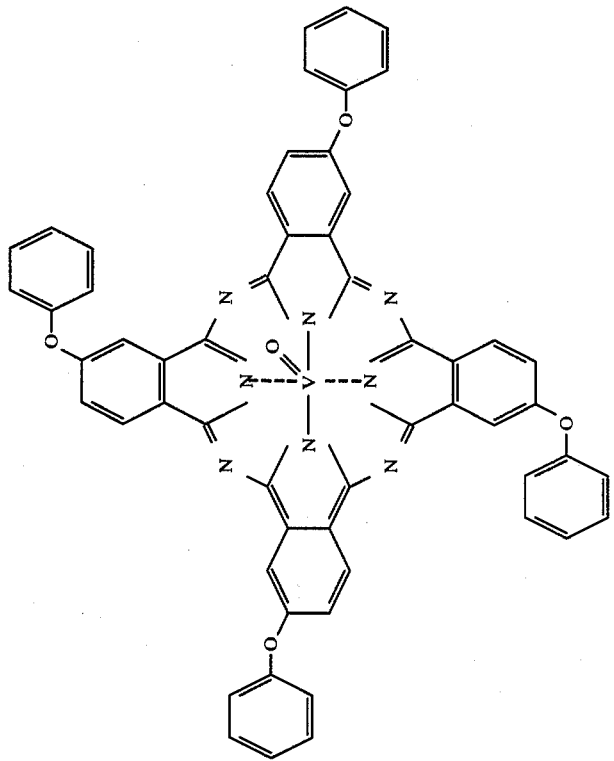

-continued
[XVIII]
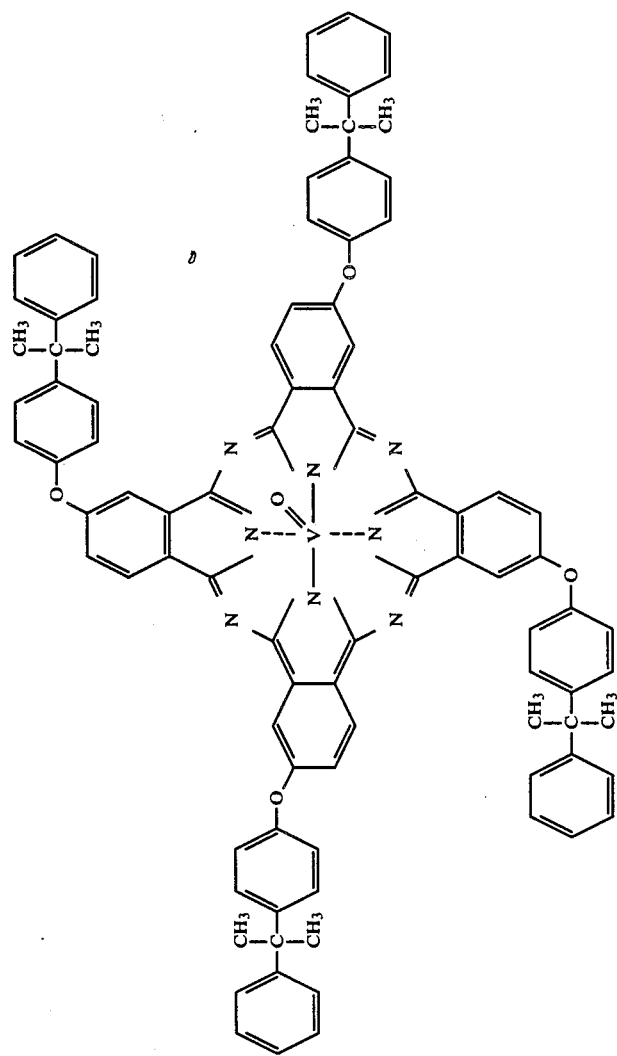

-continued
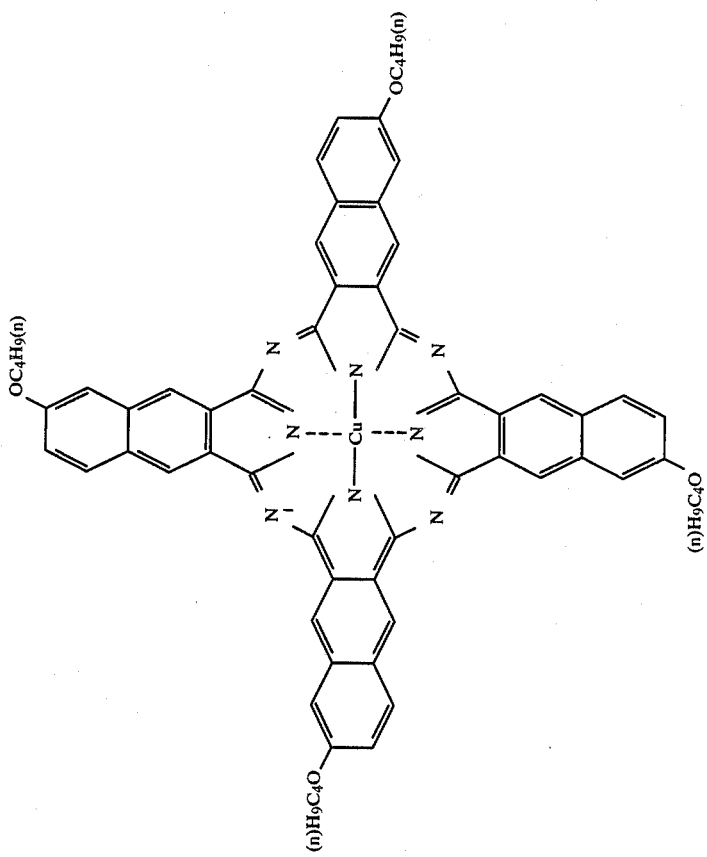
[XX]
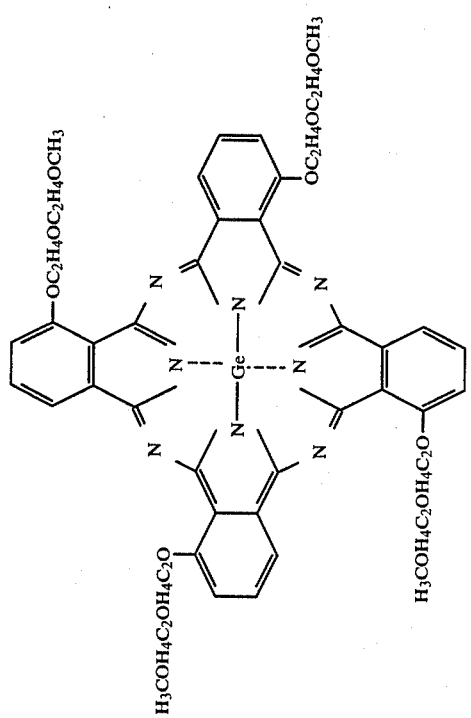
[XIX]

[XXI]
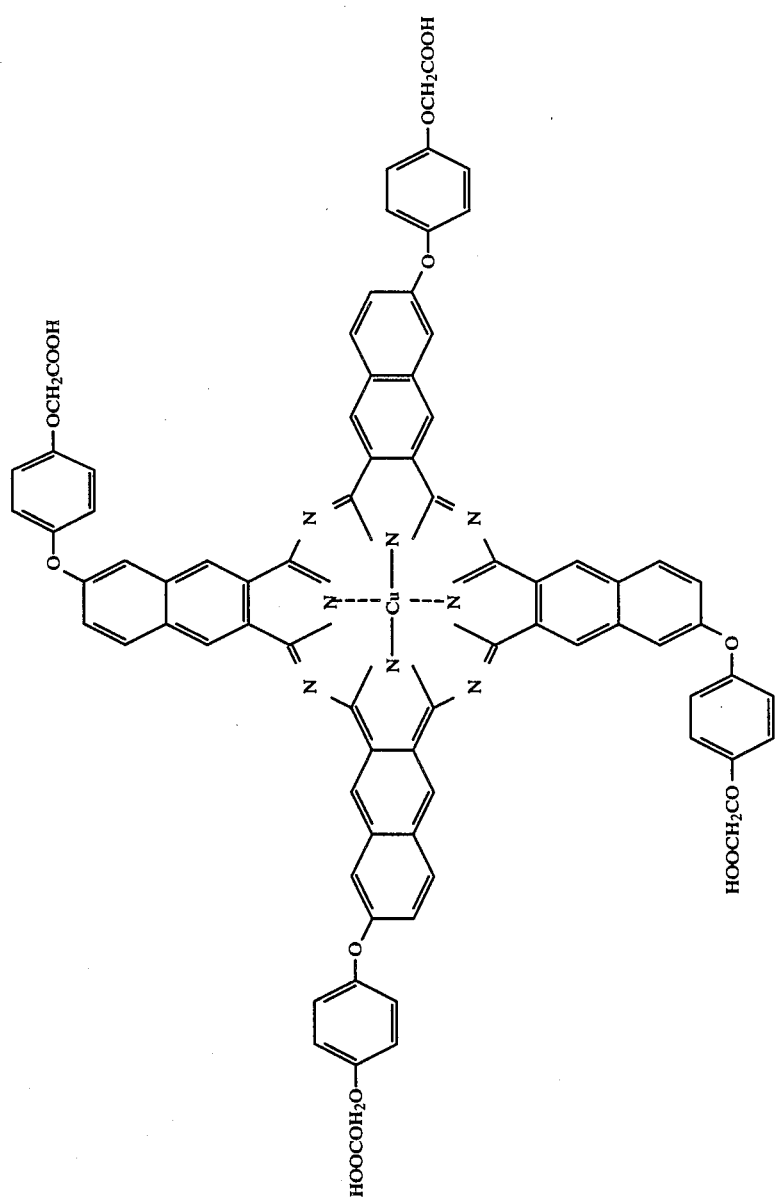

[XXII]
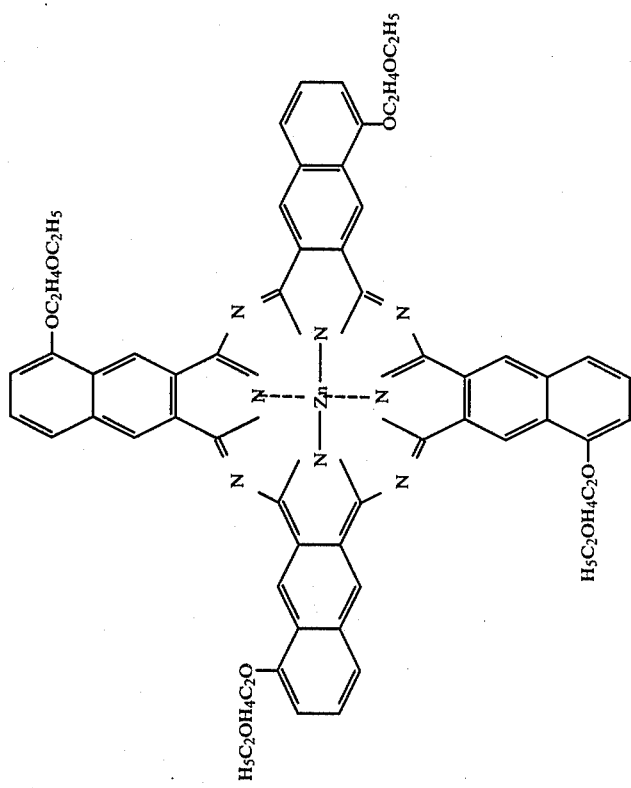

-continued
[XXIII]
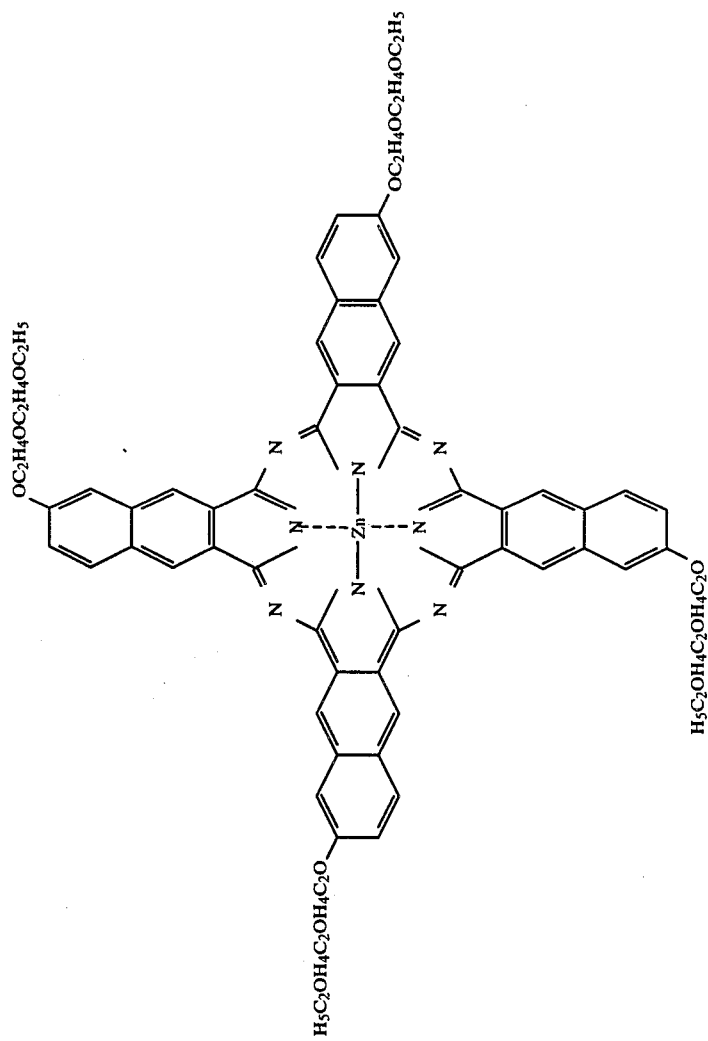

[XXIV] -continued
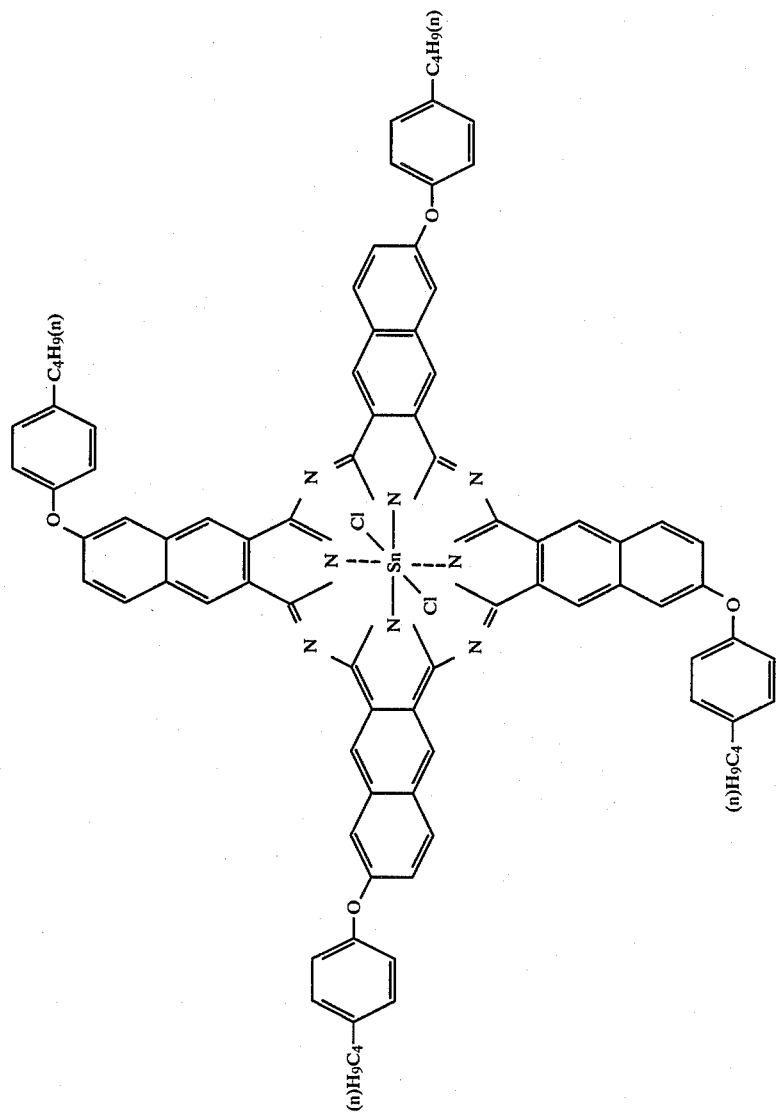

-continued
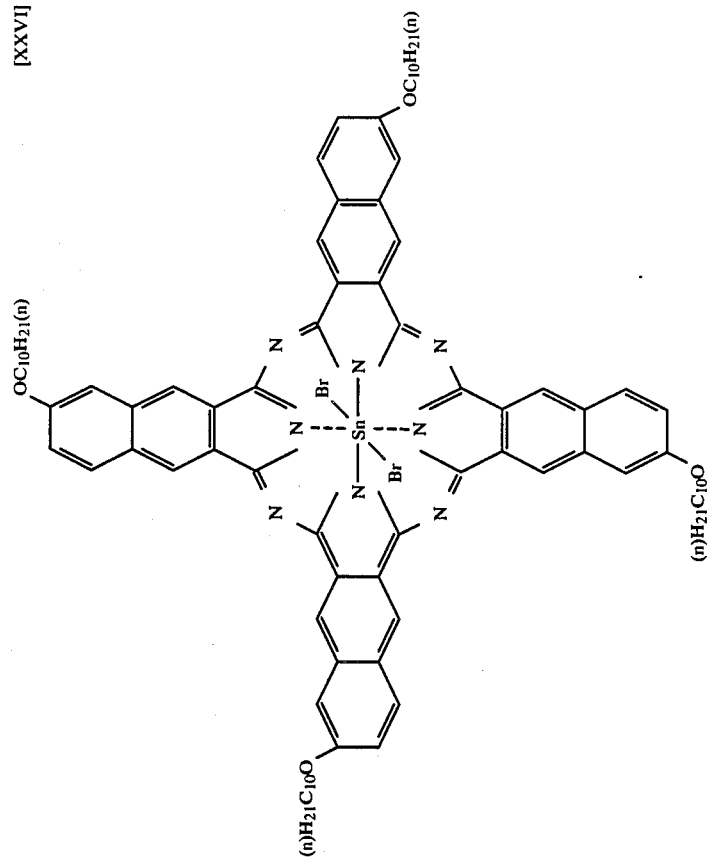
[XXVI]
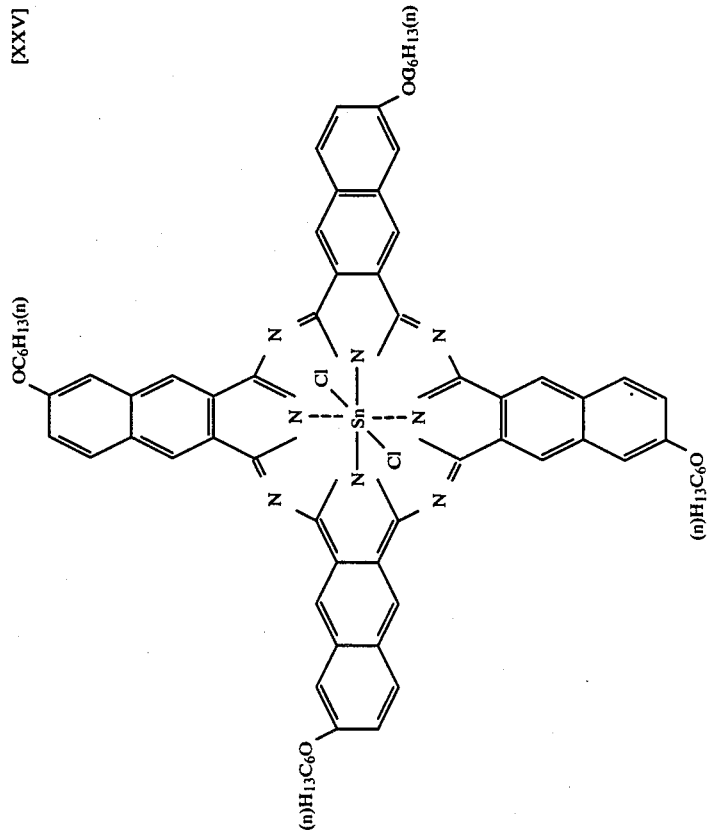
[XXV]

-continued
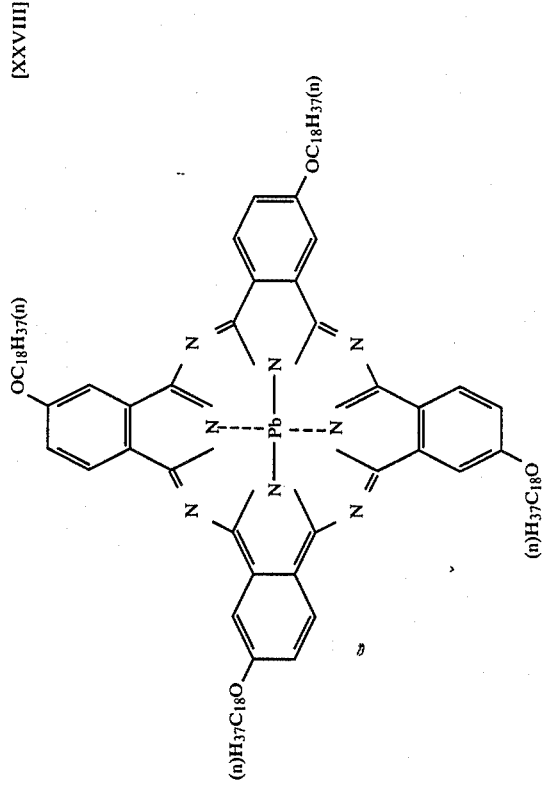
[XXVIII]
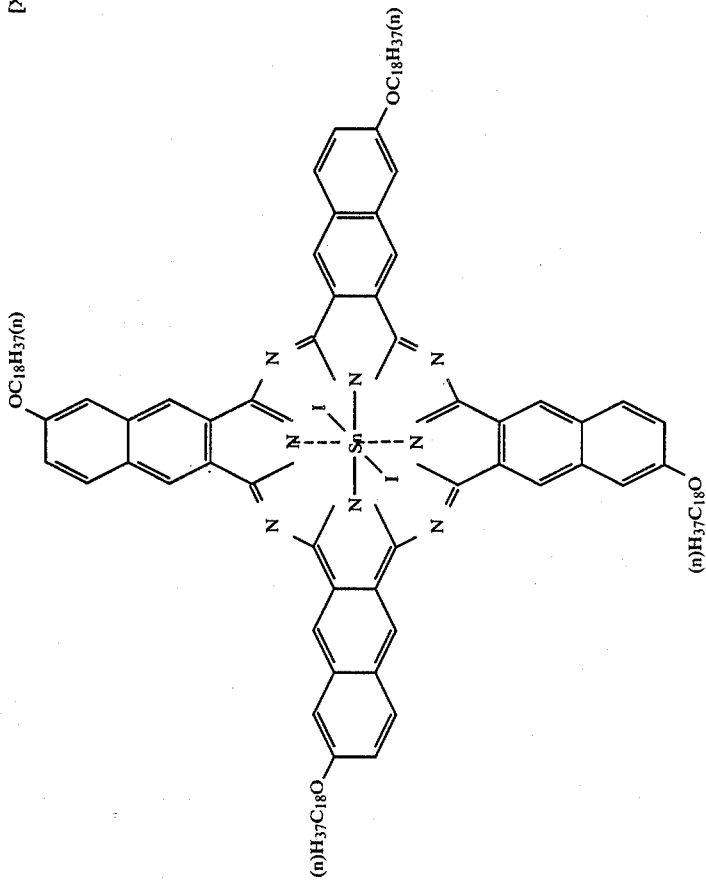
[XXVII]

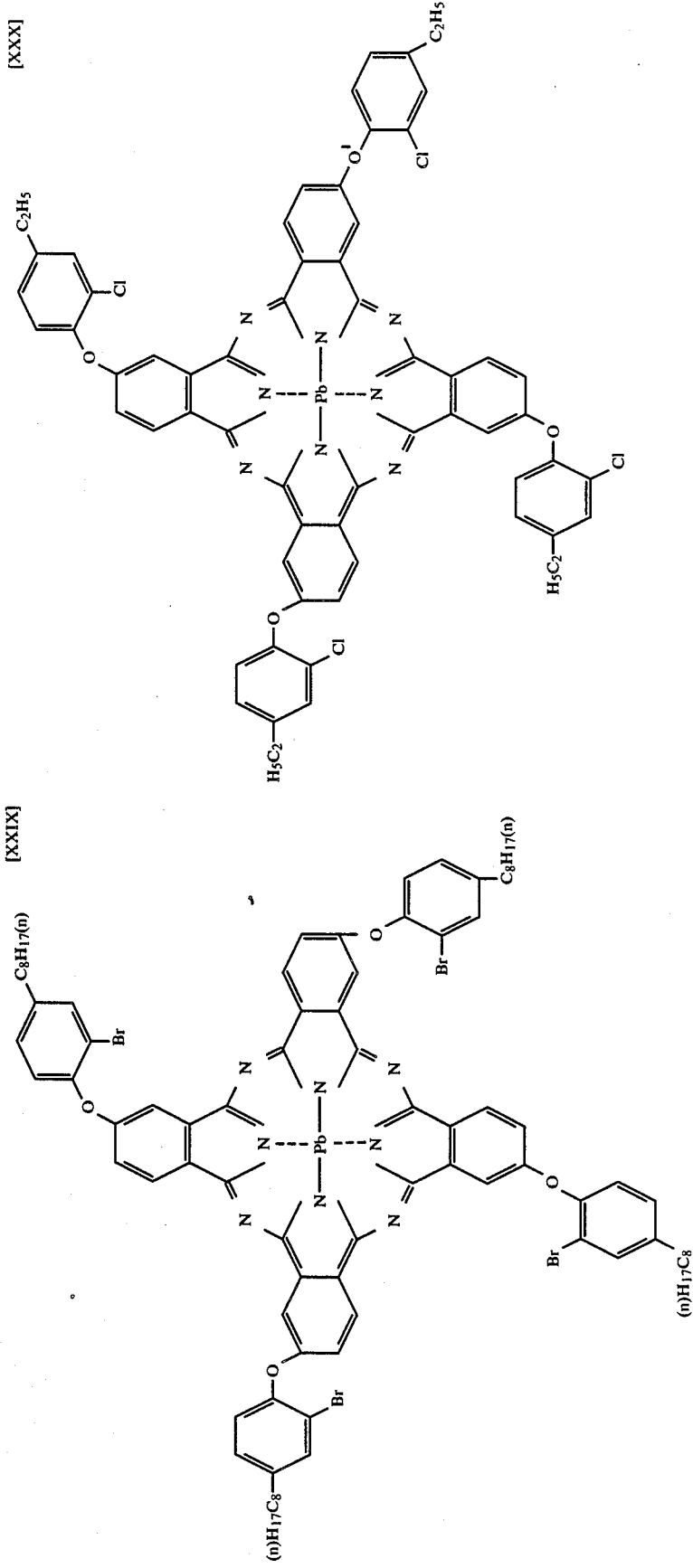

-continued
[XXXI]
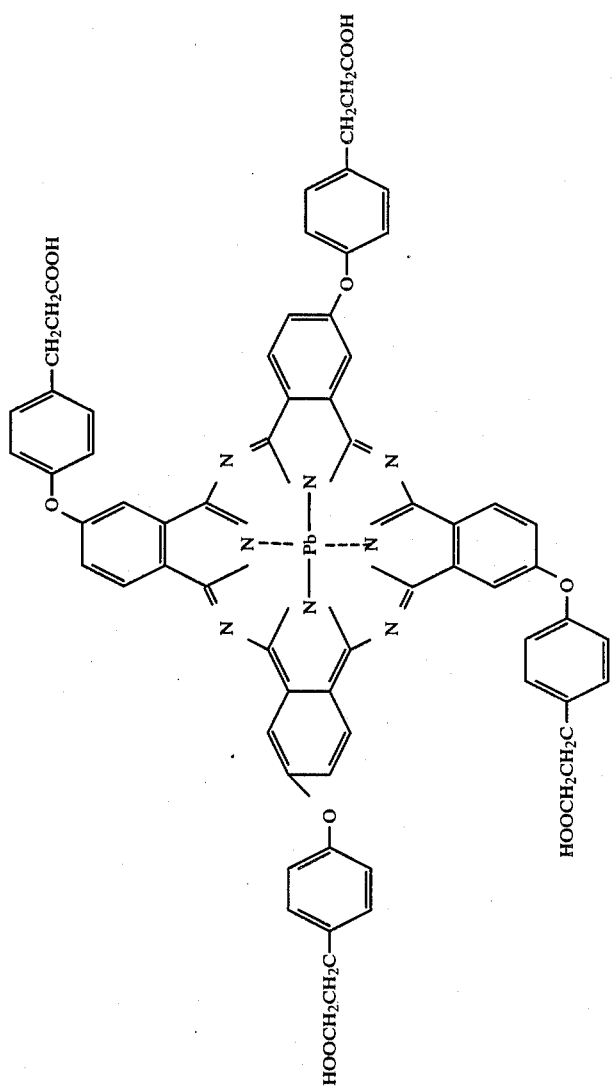

-continued
[XXXII]
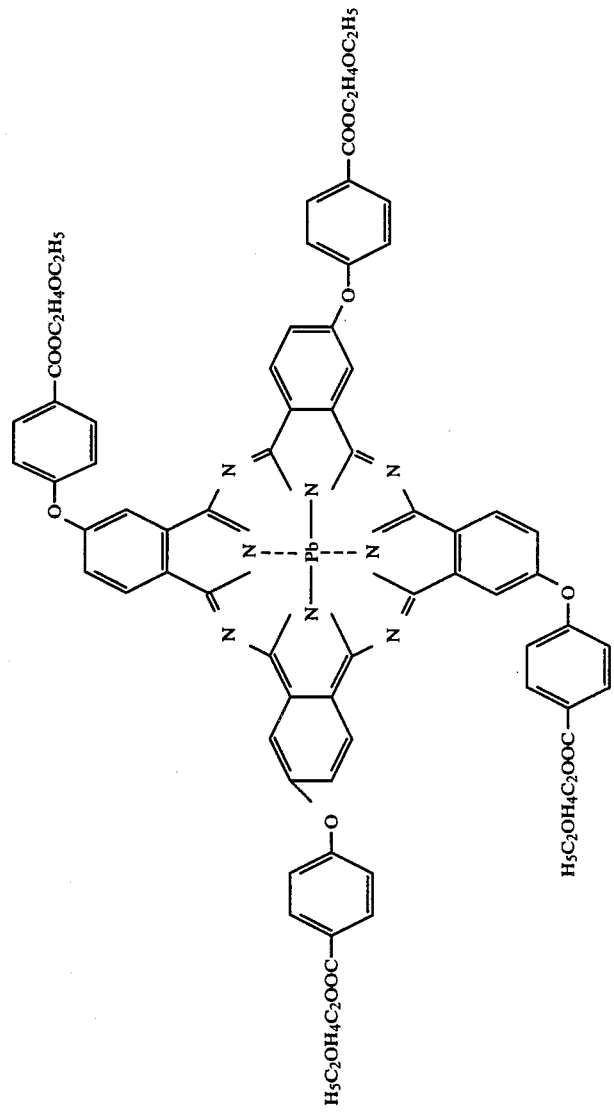

-continued
[XXXIII]
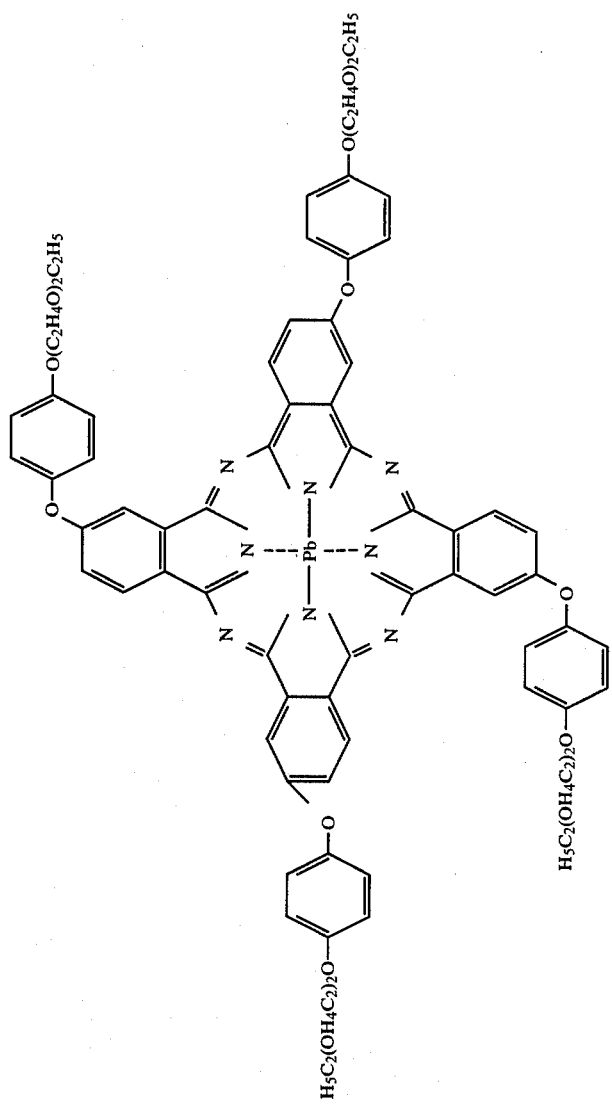

-continued
[XXXIV]
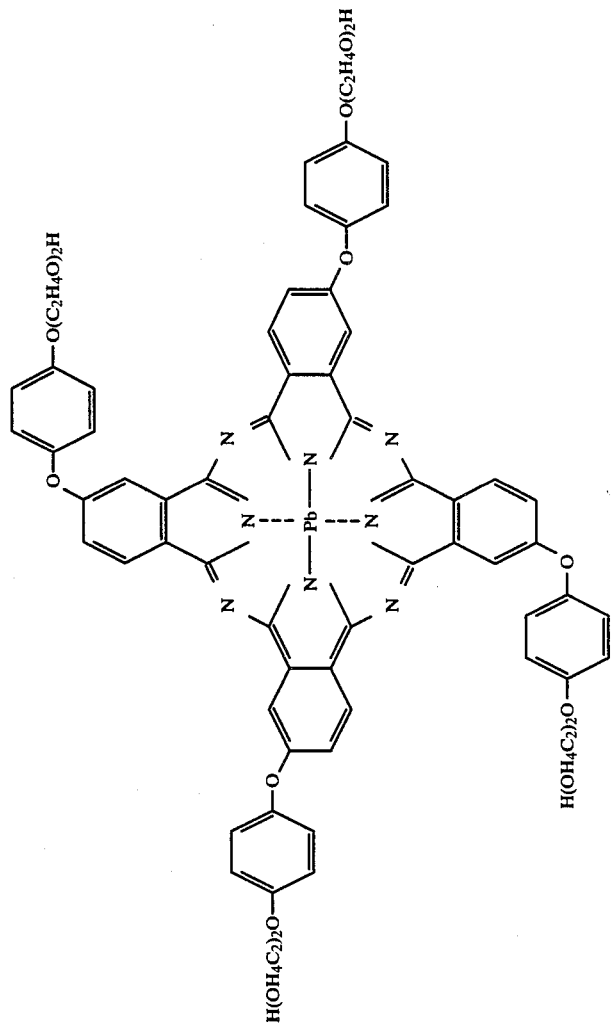

-continued
[XXXV]
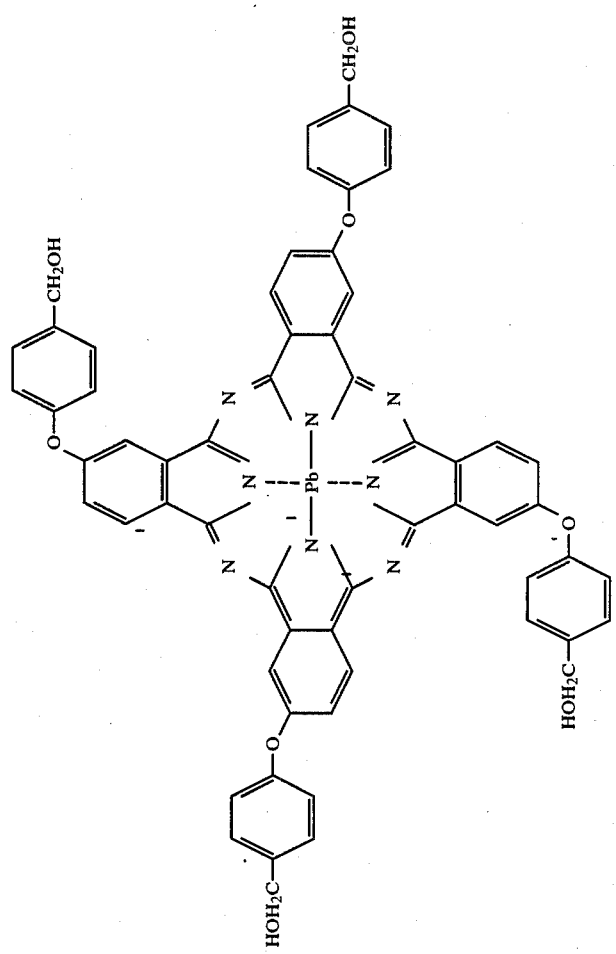

-continued
[XXXVI]
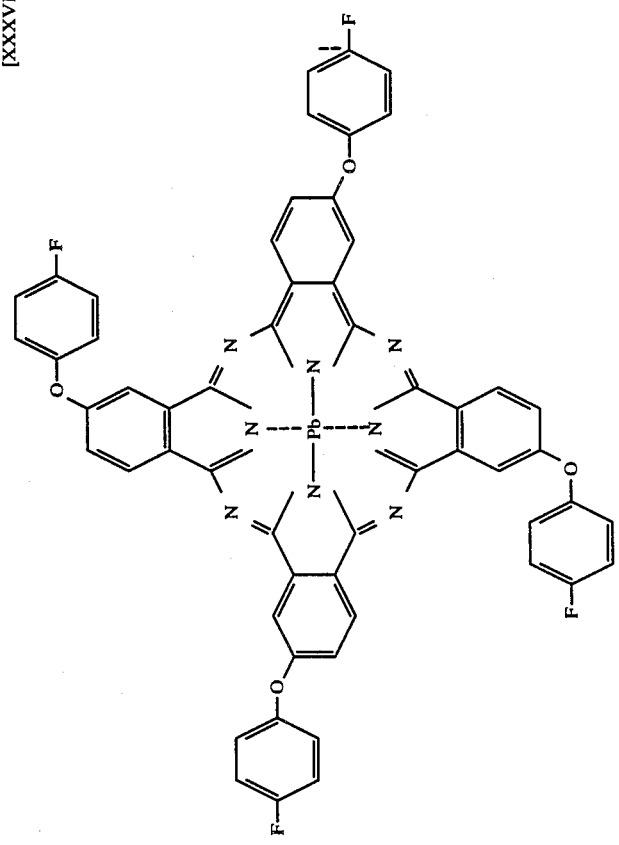
[XXXVII]
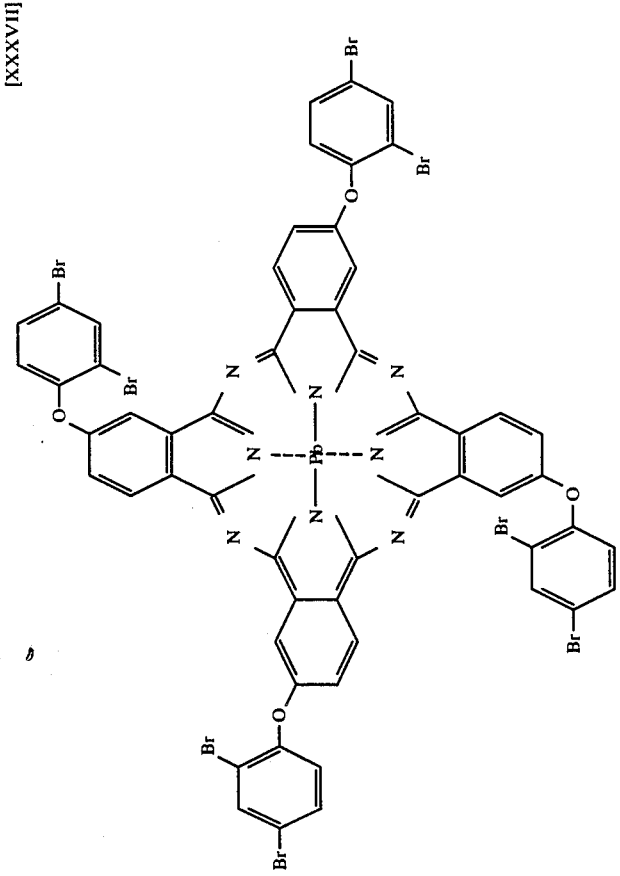

[XXXVIII]
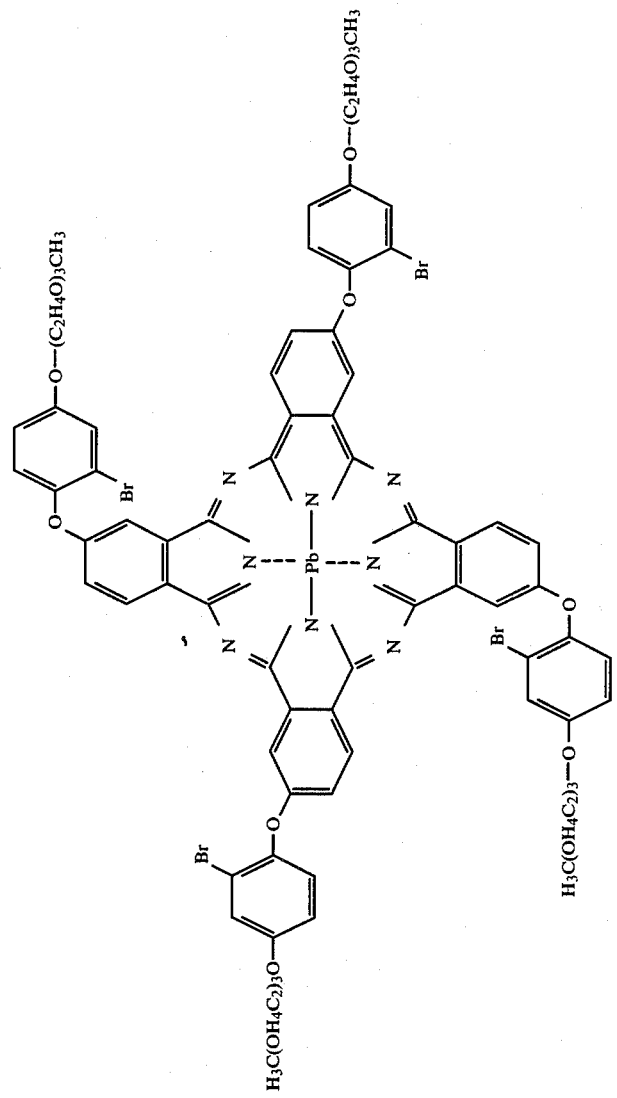

TABLE 1

| EXAMPLE | LIGHT ABSORBING SUBSTANCE | MAXIMUM ABSORBING WAVELENGTH OF THIN FILM (nm) | C/N RATIO AT TIME OF SEMICONDUCTOR LASER RECORDING (dB) | STORAGE STABILITY C/N RATIO (dB) |
|---|---|---|---|---|
| 1 | [III] | 730 | 52 | 52 |
| 2 | [IV] | 740 | 50 | 50 |
| 3 | [V] | 740 | 51 | 51 |
| 4 | [VI] | 740 | 50 | 50 |
| 5 | [VII] | 735 | 53 | 53 |
| 6 | [VIII] | 735 | 52 | 51 |
| 7 | [IX] | 735 | 49 | 49 |
| 8 | [X] | 700 | 51 | 51 |
| 9 | [XI] | 700 | 52 | 51 |
| 10 | [XII] | 700 | 50 | 50 |
| 11 | [XIII] | 730 | 48 | 48 |
| 12 | [XIV] | 700 | 52 | 52 |
| 13 | [XV] | 700 | 53 | 53 |
| 14 | [XVI] | 770 | 50 | 50 |
| 15 | [XVII] | 760 | 49 | 49 |
| 16 | [XVIII] | 770 | 51 | 51 |
| 17 | [XIX] | 770 | 53 | 53 |
| 18 | [XX] | 800 | 54 | 54 |
| 19 | [XXI] | 800 | 52 | 52 |
| 20 | [XXII] | 780 | 50 | 50 |
| 21 | [XXIII] | 780 | 49 | 49 |
| 22 | [XXIV] | 850 | 51 | 51 |
| 23 | [XXV] | 840 | 50 | 50 |
| 24 | [XXVI] | 840 | 50 | 50 |
| 25 | [XXVII] | 840 | 53 | 53 |
| 26 | [XXVIII] | 730 | 52 | 52 |
| 27 | [XXIX] | 732 | 52 | 52 |
| 28 | [XXX] | 732 | 52 | 52 |
| 29 | [XXXI] | 728 | 51 | 51 |
| 30 | [XXXII] | 728 | 51 | 51 |
| 31 | [XXXIII] | 730 | 50 | 50 |
| 32 | [XXXIV] | 730 | 50 | 50 |
| 33 | [XXXV] | 730 | 50 | 50 |
| 34 | [XXXVI] | 730 | 51 | 51 |
| 35 | [XXXVII] | 734 | 51 | 51 |
| 36 | [XXXVIII] | 732 | 51 | 51 |

Example 37

0.2 g of the light absorbing substance according to the present invention as represented by the formula [III] was dissolved into 10% of methyl ethyl ketone, and then 1 g of nitrocellulose solution (manufactured by Dicel K.K., Japan: 25% by weight solution of methyl ethyl keton) as a binder was added to be dissolved into it. The solution was coated on the base plate of methacrylic resin by the spin-coating technique (at the number of revolution of 1,500 rpm) to obtain a thin film of 1,200 Å thick. The maximum absorbing wavelength of this thin film was 730 nm, which indicates that it had a broad peak.

To this thin film, the semiconductor laser beam having its central wavelength of 780 nm was irradiated with a beam diameter of about 1 μm at an output of 4 mW, whereupon pits of very clear and distinct profiles, each having a width of about 1 μm and a pit length of about 2 μm were formed. The C/N (carrier level/noise level) ratio thereof was 53 dB. The writing performance (C/N ratio) of this thin film by the semiconductor laser after the same was preserved for ten days in a constant temperature and humidity vessel at 60° C. and 80% (of relative humidity) was 53 dB.

Example 38

0.2 g of the light absorbing substance according to the present invention as represented by the formula [III] was dissolved into 10 g of methyl ethyl ketone, and then 0.2 g of acetyl cellulose ("L-20"-manufactured by Dicel K.K., Japan) as a binder was added into the dissolved into it. The solution was coated on the base plate of methacrylic resin by the spin-coating technique (at the number of revolution of 1,500 rpm) to obtain a thin film of 1,500 Å thick. The maximum absorbing wavelength of this thin film was 730 nm, which indicates that it had a broad peak.

To this thin film, the semiconductor laser beam having its central wavelength of 780 nm was irradiated with a beam diameter of about 1 μm at an output of 4 mW, whereupon pits of very clear and distinct profiles, each having a width of about 1 μm and a pit length of about 2 μm were formed. The C/N (carrier level/noise level) ratio thereof was 52 dB.

The writing performance (C/N ratio) of this thin film by the semiconductor laser after the same was preserved for ten days in a constant temperature and humidity vessel at 60° C. and 80% (of relative humidity) was 52 dB.

INDUSTRIAL APPLICABILITY

Besides the method of producing it by the evaporative deposition of phthalocyanine type coloring matter represented by a particular structural formula onto the base plate, the optical recording member of the present invention can also be manufactured by the coating method, in which the light absorbing substance is applied onto the base plate. The obtained optical recording member according to the present invention has high reflection factor, on account of which its contrast is satisfactory as indicated by the C/N ratio, with the consequence that the information recorded in the optical recording member can be easily and clearly reproduced.

We claim:

1. An optical recording member, comprising:

a recording layer containing a light absorbing substance supported on a substrate, said optical recording layer recording information by being thermally deformed upon impact of a laser beam on portions of the recording layer and reproducing information by permitting the reading of a difference in reflections between the non-deformed portions and the deformed portions of said recording layer, the light recording substance of said recording layer being a metal complex of the formula:

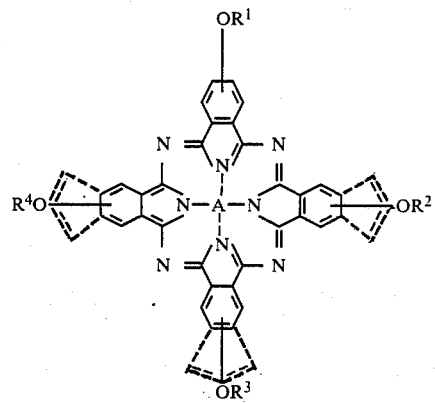

wherein $R^1$, $R^2$, $R^3$ and $R^4$ each represent $-C_2H_4O-_nY$, wherein Y represents hydrogen, aryl or alkyl, each of which may be substituted, n is an integer of from 1 to 4 and A is a metal of the group I-B series, the group II-A series, the group II-B series, the group III-A series, the group III-B series, the group IV-A series, the group IV-B series, the group V-B series and of group VIII of the Periodic Table, or compounds containing said metals.

2. The optical recording member according to claim 1, wherein A is Sn, $SnL_2$, Ge, $GeL_2$, Pb, Fe, Ni, Co, VO, InL, TiO, Si, Cu, Mg, Zn, or AlL, wherein L is halogen.

3. The optical recording member accordng to claim 2, wherein A is VO, Ni, or Cu.

4. The optical recording member according to claim 1, wherein $R^1$, $R^2$, $R^3$ and $R^4$ are (lower)alkoxy(lower)alkyl groups.

5. The optical recording member according to claim 4, wherein said (lower)alkoxy(lower)alkyl group is methoxyethyl or butoxyethyl.

6. The optical recording member according to claim 1, wherein substituent Y is phenyl.

7. The optical recording member according to claim 1, wherein said substituent Y is $C_{1-25}$ alkyl or a $C_{1-25}$ alkyl group substituted by hydroxyl, carboxyl or carboxylic acid ester.

* * * * *

UNITED STATES PATENT AND TRADEMARK OFFICE
CERTIFICATE OF CORRECTION

PATENT NO. : 4,769,307
DATED : September 6, 1988
INVENTOR(S) : TETSUO OZAWA ET AL It is certified that error appears in the above-identified patent and that said Letters Patent is hereby corrected as shown below:

| Col. | Line | |
|---|---|---|
| 53 | 43, | delete "recording" and insert --absorbing--, |
| 54 | 1-16, | replace formula as follows: |

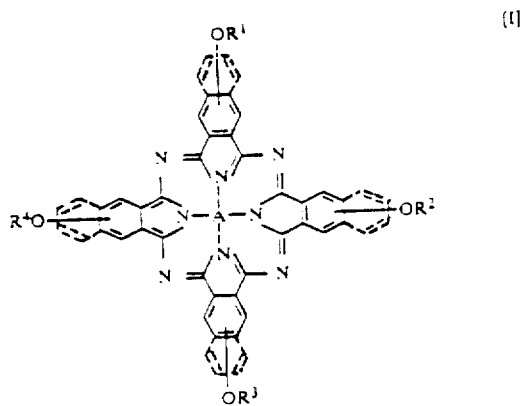

(I)

54   19 & 20, delete "$-C_2H_4O-_nY$" and insert --$(C_2H_4O)_nY$--.

Signed and Sealed this

Twenty-third Day of May, 1989

Attest:

DONALD J. QUIGG

*Attesting Officer*     Commissioner of Patents and Trademarks